US005216569A

United States Patent [19]

Brookhiser

[11] Patent Number: 5,216,569

[45] Date of Patent: Jun. 1, 1993

[54] METHOD AND MEANS FOR SUPPRESSING CABLE LINE TRANSIENTS

[75] Inventor: William L. Brookhiser, Lawrenceville, Ga.

[73] Assignee: Cable Innovations, Inc., Lawrenceville, Ga.

[21] Appl. No.: 872,064

[22] Filed: Apr. 22, 1992

Related U.S. Application Data

[63] Continuation-in-part of Ser. No. 705,719, May 24, 1991, abandoned.

[51] Int. Cl.[5] .............................................. H02H 7/00

[52] U.S. Cl. .................................... 361/107; 361/118

[58] Field of Search ................ 361/107, 56, 111, 113, 361/117, 118, 119; 333/167, 172

[56] References Cited

U.S. PATENT DOCUMENTS

| | | | |
|---|---|---|---|
| 4,679,114 | 7/1987 | Carpenter | 361/117 |
| 4,752,854 | 6/1988 | Lefort et al. | 361/117 |
| 4,939,618 | 6/1990 | Fingerson et al. | 361/117 |
| 4,993,960 | 2/1991 | Franks | 361/119 |
| 5,001,587 | 3/1991 | Clark | 361/117 |
| 5,122,921 | 6/1992 | Koss | 361/118 |

*Primary Examiner*—Steven L. Stephan
*Assistant Examiner*—Matthew Nguyen
*Attorney, Agent, or Firm*—James A. Hinkle

[57] ABSTRACT

An electrical grounding suppressor device, and the method of using the same, which is placed directly in line with the co-axial center conductor of cable television distribution lines without inhibiting or causing significant loss of the radio frequency signal in the co-ax line. An electronic circuit senses a transient surge on the co-ax line and triggers a rapid clamping action to ground to dissipate the harmful effects of the surge.

4 Claims, 3 Drawing Sheets

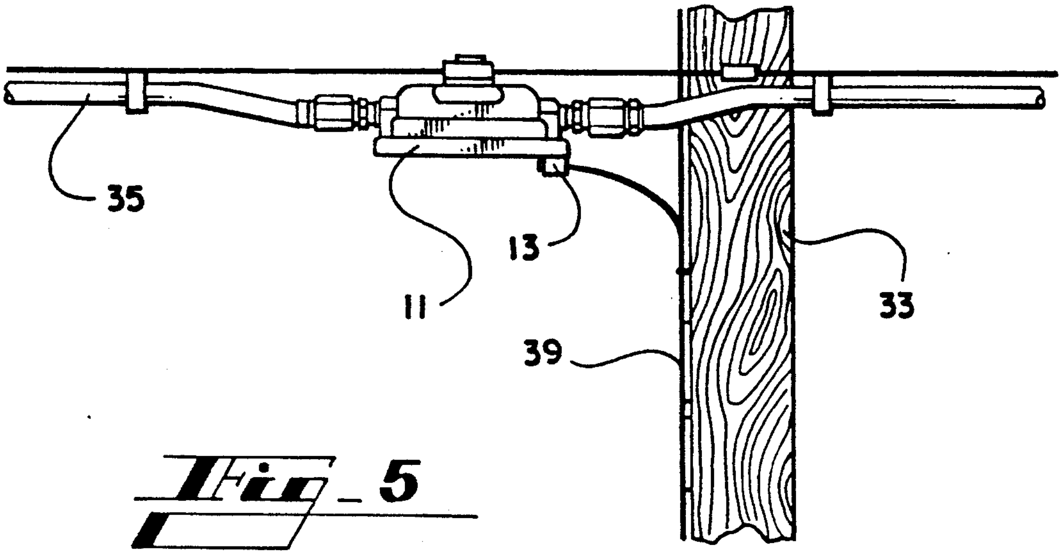
Fig_5
Fig_6
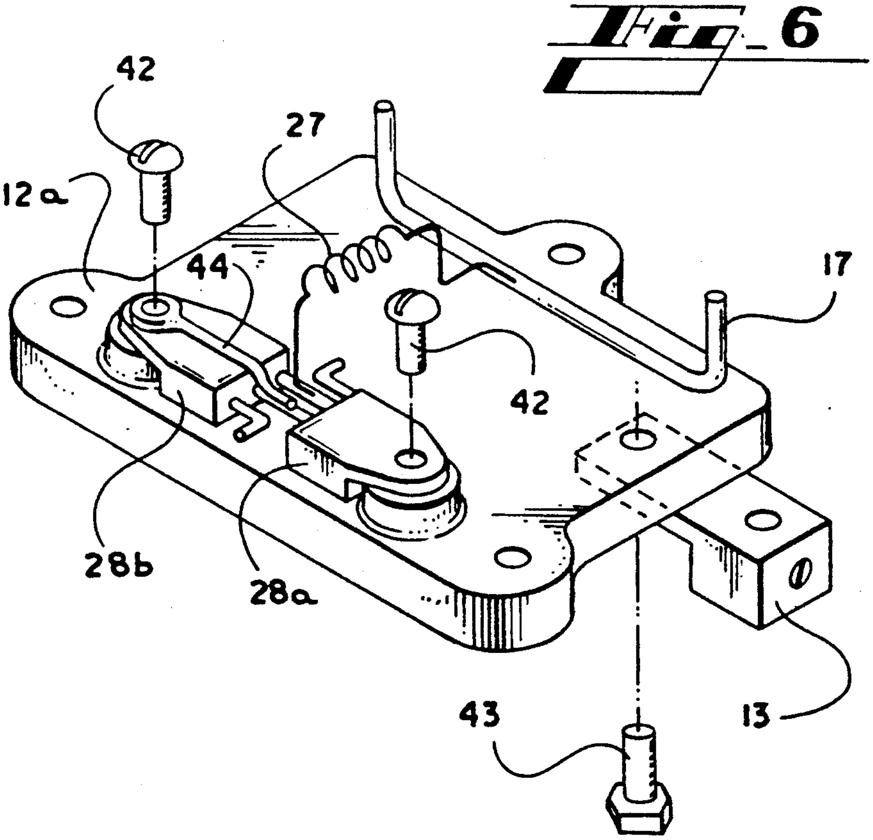

METHOD AND MEANS FOR SUPPRESSING CABLE LINE TRANSIENTS

This application is a continuation in part of Ser. No. 07/705,719 filed on May 24, 1991 now abandoned.

BACKGROUND OF THE INVENTION

I. Field of the Invention

The present invention relates generally to the field of electrical grounding devices and more particularly, to a device which may be inserted into a radio frequency coaxial cable system to render surge protection to sensitive electronic devices and to ground the system in a rapid and inexpensive manner, and to the method of utilizing the invention.

II. Description of the Prior Art

In systems such a coaxial cable television distribution (CATV) systems, there are numerous sensitive electronic devices located at various locations within the system that are highly susceptible to power surges and the like from whatever source. Not only may surges be introduced into the system from local power sources, but it is quite common that cable systems are knocked out of service due to nearby lightning strikes, especially during the peak storm periods. In most cases lightning strikes will cause outages due to burned out amplifiers and fuses, and surveys have shown that outages are a substantial cause of subscriber dissatisfaction. Typically the outage has to be repaired as rapidly as possible, and normally under extremely poor conditions by both regular and standby personnel of the cable television company. If a lightning storm is of long duration then it is quite conceivable that there will be multiple areas in a system which will experience an outage thereby complicating the repair procedure. It is not unusual to have lightning strikes which will induce currents into an electrical conductor measuring several thousand amperes.

There are essentially three ways to protect equipment and outside structures from lightning. The first is a remedial approach wherein lightning strokes are accepted, and the equipment of interest is either designed to withstand the surges or is protected by devices which aid in dissipating the surge energy after a stroke has occurred. The present invention is of this first remedial class. The second is a preventive approach wherein devices are employed to prevent the static charge from building up and, therefore, prevent the possibility of a lightning stroke before it occurs. A system taking this preventive approach is described in U.S. Pat. No. 4,679,114 by Carpenter. This solution employs means to sense the build-up of atmospheric charge and, in response, actively causes a countercharge to build up on a strategically placed electrode thereby neutralizing the atmosphere's static charge in its vicinity and preventing a local lightening stroke. A third approach is to affix lightening attractive conductors at high points over a structure to be protected. These lightening attractive conductors or "lightening rods" are directly connected to earth by heavy, low resistance, low inductive down conductors. This third system provides its protection by preferentially attracting and safely dissipating direct lightening strokes, thus keeping such strokes from directly hitting the protected structure. The invention of Lefort et al (U.S. Pat. No. 4,752,854) is an improved device of this class. These latter two approaches have been used effectively in protecting isolated structures such as radio towers and radar antennaas, but they are not practical for widely distributed systems such as cable television systems. In the case of an outside distribution trunk cable system, prevention is impractical due to the vast area which is covered by the distribution system. It is also necessary since the cable lines are normally installed substantially below power company lines which usually intercept lightening strokes before they directly hit the co-axial cable television cable. Moreover, such atmosphere charge neutralizing and lightening rod systems are completely ineffective in responding to current surges which are caused by power line faults and power system switching transients. These latter surges can occur quite independent of lightening conditions, and are common causes of damage to sensitive communications amplifiers in cable systems.

Therefore, the remedial approach is the most likely approach of this invention in preventing damage to cable television installations. There have been previous devices which have attempted to solve the problem, but typically they have had faults which render the devices only marginally effective. Many previous devices such as represented by U.S. Pat. Nos. 4,939,618 by Fingerson et al, and 5,001,587 by Clark employ conventional air spark gaps which break over at a relatively high voltage to shunt high energy lightning surges to ground. Such devices are characterized by a high degree of variability in their breakover voltage, which variability increases with age and service. Further, their breakover voltages are high enough that sensitive cable trunk line amplifiers and the like can be damaged before they operate. While useful in protecting rugged systems such as electric fences and railroad signals, they are inadequate for application to coaxial cable television distribution systems.

One particular prior art device which has been used in cable television systems employs a power surge suppressor installed on the a.c. power line side of the power inserter, but not on the center conductor of a cable line. Therefore, the SCR type switches used can only protect what surges come from the main trunk line power supply and nothing else. It has been found that these prior art suppressors often fail to protect the RF signal amplifiers along the coaxial cable line. In addition, the prior art device is also mounted on a printed circuit board within the power insertion device in a manner which provides a poor path to ground with limited current carrying capability. In these prior devices, the surge current is conveyed from the circuit board through mounting screws into the base, and therefrom to the cover of the case through screws which attach the cover. There is generally a moisture sealing gasket between base and cover, thereby confining most of the current through the high resistance stainless steel cover screws. From the cover, the current is carried to the cable support strand through the strand mounting clamp on the top of the cover. It is apparent that this is a circuitous path for the surge current to follow with many opportunities for high contact resistances to develop due to ageing, corrosion, and movement due to wind. Experience has been that many of these suppressor are themselves damaged by the events against which they are designed to protect, often by internal arcing or conductor burn-out within their cases. Further, the prior art device cannot be directly connected across the radiio frequency (hereinafter referred to as "RF") signal carrying center conductor of the coaxial cable because of its high RF loading and resulting insertion loss. While it might afford some protection of the amplifiers if so connected, its presence on the line would attenuate the primary transmission signal excessively, thereby rendering the cable system useless.

What is needed, and what has not yet been provided by the prior art, is a cable line surge suppressor which can be connected directly to the RF signal carrying center conductor without inducing significant insertion loss, and which will effectively shunt lightning and power system induced surges to ground, without allowing damage to sensitive amplifiers on the line, and without sustaining damage to itself.

SUMMARY OF THE INVENTION

In accordance with the present invention, it is contemplated that a power line suppressor will be provided which may be installed anywhere within a trunk or feeder cable line directly within the radio frequency path with no significant insertion loss. Further, it is anticipated that the present invention will effectively ground high amperage loads on a continuous basis without sustaining damage internally.

It is, therefore, an object of the present invention to provide a power suppressor for cable line use which is self-contained, can be installed anywhere within the cable line, and which has no insertion loss within the radio frequency path.

Another object of the invention is that the invention provides full amperage protection with SCR type switches are directly on the case of the device to provide a low resistance, low inductance, direct path to ground for a much higher current carrying capability.

Yet another object of the invention is a provision of an easily manufactured, relatively inexpensive transient power suppressing device which is readily adapted for use within the cable industry to shunt large surge loads to ground, thereby preventing damage to delicate electronic devices.

Other objects, advantages and capabilities of the invention will become apparent from the following description taken in conjunction with the accompanying drawings, showing only a preferred embodiment of the invention.

BRIEF DESCRIPTION OF THE DRAWINGS

FIG. 5 is a more detailed view of the invention mounted in the coaxial cable line adjacent to a pole; and FIG. 6 is an abbreviated schematic view of the mounting base showing the important details of the SCR mounting and ground path.

DESCRIPTION OF THE PREFERRED EMBODIMENT

Figure 1:
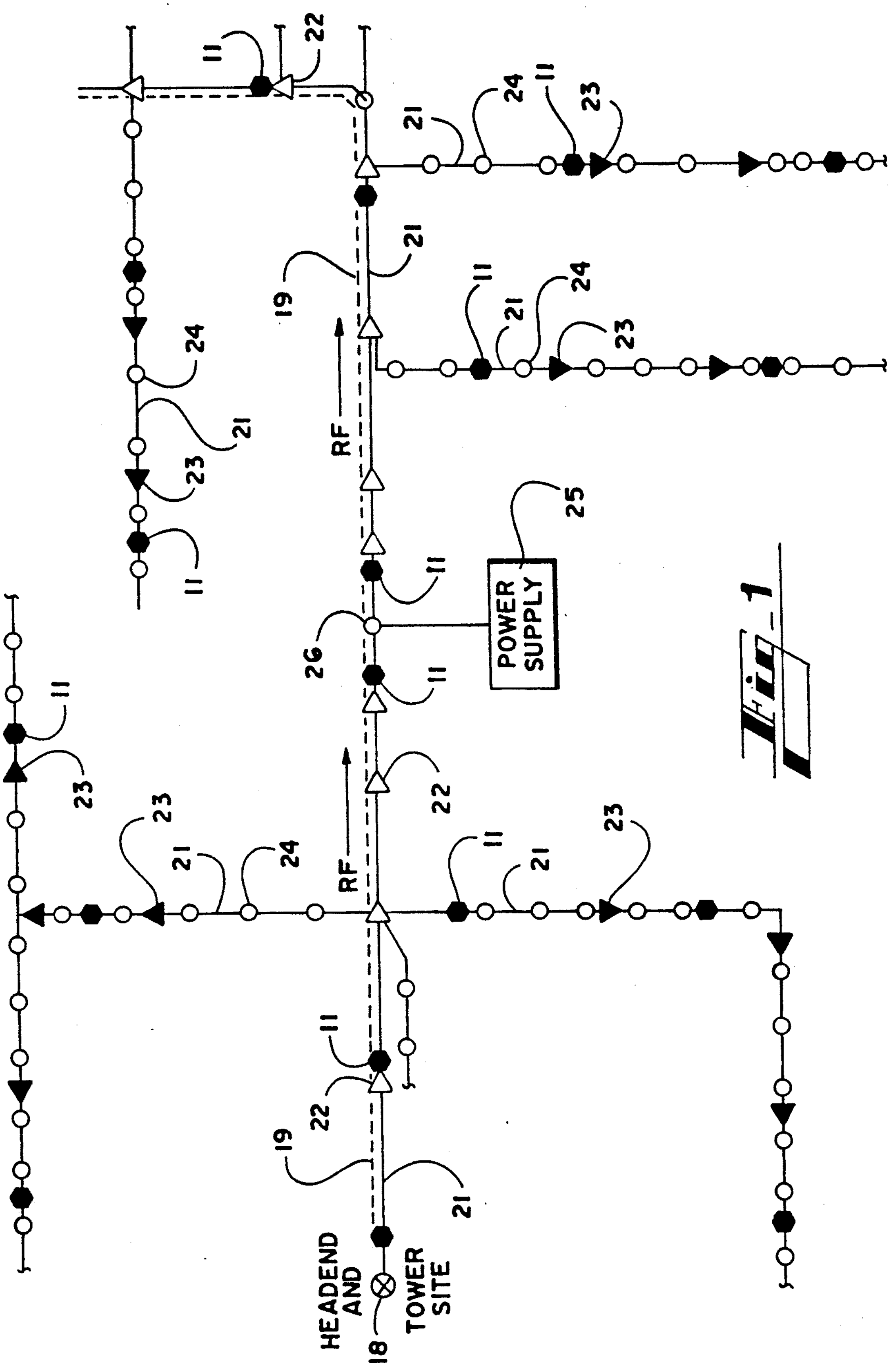
FIG. 1 is a schematic diagram of a typical cable television distribution system showing various devices as they would normally occur, and showing the use of the present invention.

Referring to the drawings wherein like numerals designate corresponding parts throughout the several figures, the cable line power suppressor of the present invention is generally indicated by the numeral 11. The present suppressor is a self-contained unit which does not have to be re-installed in other devices in the cable line system. The suppressor case 12 is a heavy duty metal case which allows transient currents to be quickly dissipated to ground, and to allow superior heat sink capabilities for the electronic devices contained therein.

Figure 3:
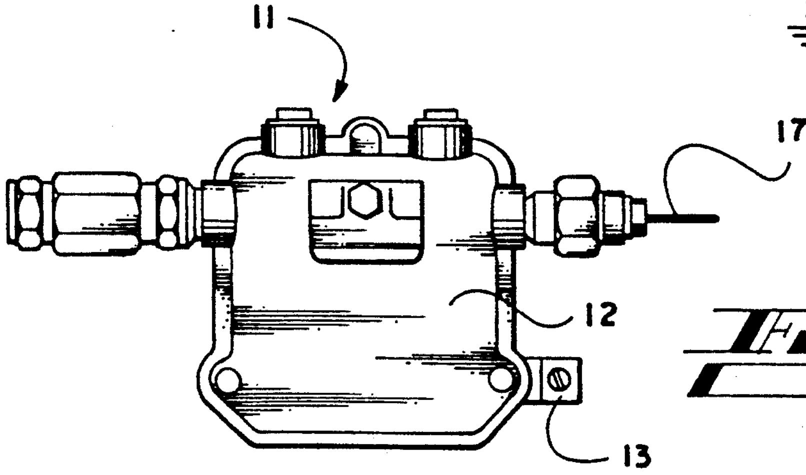
FIG. 3 is a top plan view of the mounting case which contains the invention.

Generally the case and fittings include a bonding clamp 13 for grounding purposes, which clamp is affixed to base 12*a* of the case 12 by a suitable fastener. The case 12 encloses the electrical components in a water tight environment and attaches to the cable line in a typical manner by means of suitable cable fittings. For illustrative purposes, the center conductor 17 of a typical co-ax cable is shown in FIG. 3, however the remaining portions of the co-ax cable have not been shown for purposes of clarity.

Referring now to FIG. 1, which shows a typical cable television distribution system, the present invention has been placed at various places within the system to show its proposed use. The typical system, as shown, generally comprises an antenna tower site 18 where the signal normally originates. A signal is typically supplied to the system through trunk cable lines 19 and through feeder cable lines 21. The feeder cable lines typically receive the programming signal from the trunk cable line 19, which in turn receives the programming signal from the tower site 18. In normal practice, a signal is typically amplified by means of line amplifiers, and such amplifiers are indicated for the trunk cable line by the open triangular symbol 22. The closed triangular symbol 23 represents the line extender amplifiers which are used on the distribution legs. The tap for an individual customer is shown in the feeder cable lines as an open circle symbol indicated by numeral 24. At various places along the cable system lines, electrical power needs to be inserted into the line to power the various amplifiers which maintain the signal at a desired level throughout the system. In the system shown in FIG. 1, the power is supplied through a power supply 25 and inserted into the system cable lines by means of a power inserter 26. Within the system of FIG. 1, the suppressor 11 of the present invention is indicated by the closed hexagonal symbol 11 which may be inserted into either the trunk cable line 19 or the feeder cable line 21 at desired locations to suppress surges and thereby prevent damage to sensitive electronic components of a system. Heretofore, in the prior art, it was only possible to protect the system by inserting a clamping device between the power supply 25 and the power inserter 26. There has previously been no mechanism for protecting "downline" components past the power inserter 26. FIG. 1 shows a separate inserter 26 leading from the power supply 25 and wherein the inserter is connected into the co-ax line 19. However, the inserter may be combined with a suppressor 11 into one unitary structure.

Figure 2:
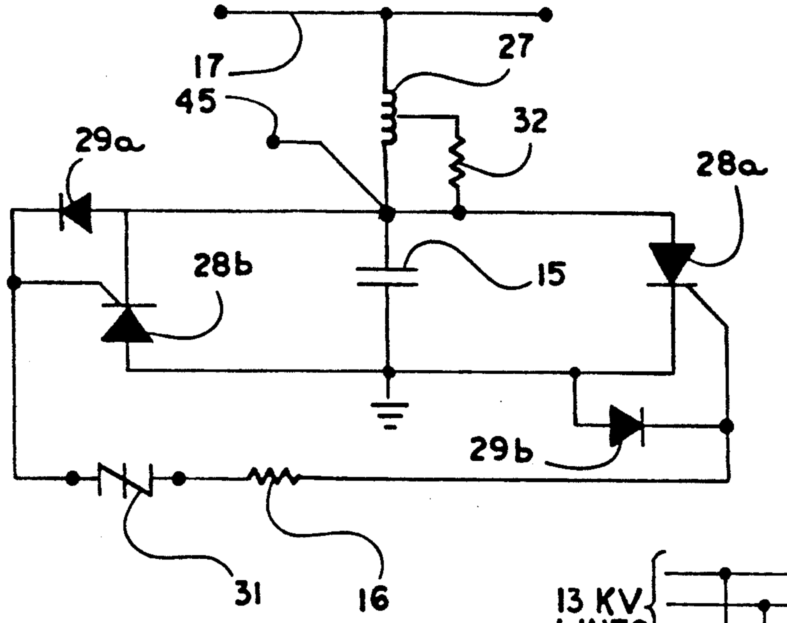
FIG. 2 is an electrical schematic diagram of the circuitry of the present invention.

Turning now to FIG. 2 which shows the electronic circuit for effecting the desired purposes of the suppressor of the present invention, the circuit is connected to the center conductor 17 through a radio frequency choke coil 27 and shunt damping resistor 32. The protection circuit comprises a pair of SCR's indicated by numerals 28*a* and 28*b*, and having a pair of steering diodes 29*a* and 29*b* mounted across the terminals of the SCR's as shown. A trigger circuit element 31 comprises a SIDAC high voltage, bilateral trigger device for controlling the operation of the SCR's. Typical values and nomenclature of the components utilized in the preferred embodiment shown in FIG. 2, are as follows:

| | |
|---|---|
| SCRs:<br>S 2035J<br>Teccor Electronics Inc.<br>SIDAC:<br>K-1100E<br>Teccor Electronics Inc. | Trigger Sensing:<br>104 volts peak minimum<br>110 volts peak maximum<br>Current Suppression:<br>35 amps continuous<br>500 amps for 8.3 milliseconds<br>1000 amps for 1 microsecond |
| Choke Coil:<br>20 turns<br>No. 16 enamel wire on ¼" ferrite core with center tap. | Suppression Length (Maximum):<br>½ cycle (8.3 milliseconds) |
| Heat Dissipation:<br>The SCR's are mounted directly to base 12a for heat sink and grounding purposes. | Suppression Length (Minimum):<br>Controlled by the a.c. phase angle. |

Figure 4:
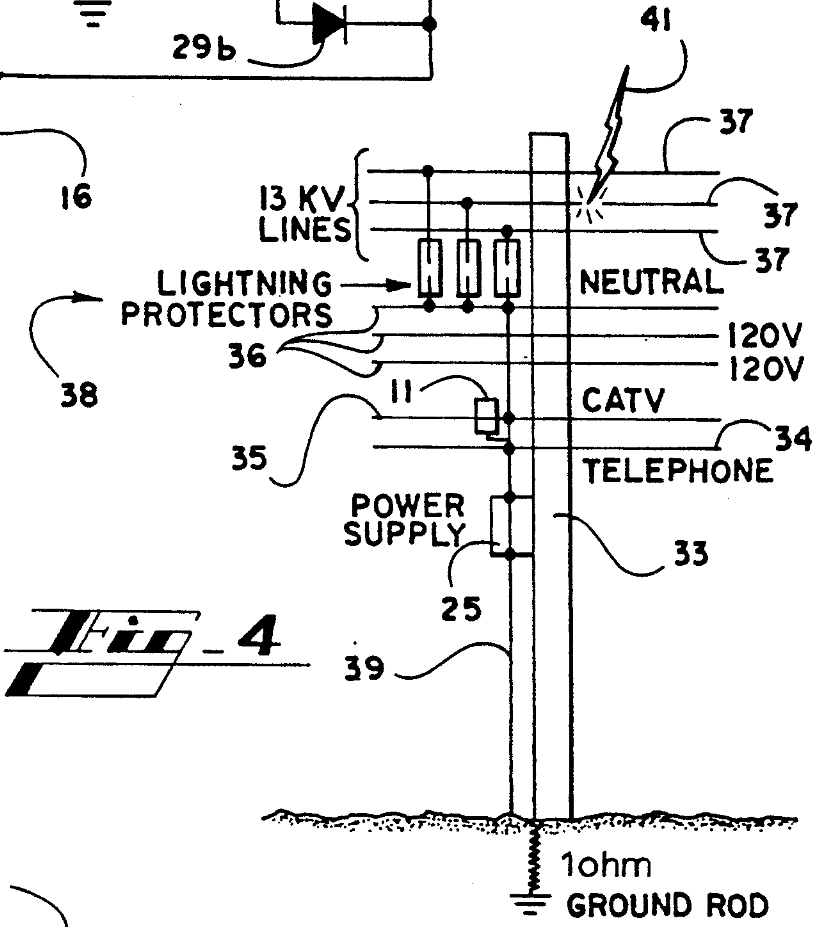
FIG. 4 is an illustration of a typical pole system showing a lightning strike upon the pole mounted power lines.

In operation of the present invention, one must understand what typically happens if there is a large surge upon the co-ax caused by a phenomenon such as a lightning strike to adjacent structures. Referring now to FIG. 4 which shows a typical co-ax cable environment, a pole 33 typically supports a telephone line 34, a cable television co-ax line 35, one or more relatively low voltage power lines 36 (including neutral), and one or more high voltage power lines 37. A local power company will typically protect the low voltage power lines 36 from power surges by means of fuses 38 interposed between the high voltage lines and the low voltage lines. In addition, the power company lines are grounded to earth ground by means of a ground rod 39 of known design. In FIG. 4 and in FIG. 5, the suppressor 11 is represented as being mounted on the co-ax cable 35 and connected to ground rod 39.

When a lightning strike 41 strikes the power line 37, the resulting surge will most likely jump the lightning protectors 38 forming an ionized conducting arc that the power surge immediately follows. The lightning stroke tries to find ground by whatever path it can and the resulting surge will be induced between all available conductors, including the co-ax line 35. It is not uncommon to have 2,000 amperes for as much as 16 to 160 milliseconds induced upon the co-ax line until the power company breakers 38 can break the power arc. The high surge current in the outer conductor of the coax induces a very high over voltage and a corresponding surge current on the center conductor 17 of the co-ax line 35 which can and does blow fuses, amplifiers, and other sensitive electronic apparatus connected to the center conductor 17. However, in utilizing the suppressor 11 of the present invention, which is tapped into the center conductor 17 of the co-ax cable 35, the circuit will be effective to sense the over-voltage and immediately fire the SCR's 28*a* and 28*b* to clamp the surge to ground and dissipate the harmful effects thereof before the other delicate electronic equipment along the truck and feeder lines are damaged. From FIG. 2, it can be seen that an overvoltage of positive polarity on the center conductor 17 will be initially blocked by SCRs 28*a* and 28*b*, and by steering diode 29*b*. It will, however, be passed by steering diode 29*a* to the bilateral voltage sensing device 31, where said voltage will build up until it reaches the pre-selected breakover voltage of the device 31. When the selected voltage is reached, current will pass through device 31 and limiting resistor 16 into the gate of SCR 28*a*. This small surge of gate current will trigger SCR 28*a* into a full on state, thereby clamping the primary surge current from center conductor 17 rapidly and safely to ground.

In the alternate event of a surge of opposite polarity, a positive potential will appear on the ground line of FIG. 2, with center conductor 17 becoming negative relative to the ground line. In this case, the symmetrical circuit of FIG. 2 reverses its performance with the positive current on the ground line now being steered through diode 29*b*, through device 31 in the opposite direction, and into the gate of SCR 28*b*, thereby triggering SCR 29*b* into its full on clamping state.

A critical feature of the circuit in FIG. 2 is the presence of RF choke 27 in conjunction with damping resistor 32. This choke is carefully designed to provide a high impedance to the RF signal propagating along center conductor 17, thereby blocking the drain of this signal to ground. This minimizes the insertion loss effect of bridging the suppressor circuit 11 onto the signal carrying center conductor in the system operating range which is typically 5 to 500 MHz. According to the present invention, RF choke 27 is carefully designed to effectively block the RF signal of interest yet readily pass the high current surges to be clamped to ground. Resistor 32 is incorporated to adjust the frequency characteristics of choke 27 and the rest of the circuit to minimize the insertion loss and reflection due to attachment to center conductor 17 over the operating frequency range of interest.

Referring to FIG. 6, it is shown that the two SCRs 28*a* and 28*b* are mounted directly to the heavy metal base 12*a* of the case 12 by means of screws 42. RF choke 27 is connected directly from center conductor 17 to the anode and cathode of SCRs 28*a* and 28*b* respectively. A heavy ground strap 44 is connected from the common juncture of the anode of SCR 28*b* and the cathode of SCR 28*a* to the base grounding point of SCR 28*b*. Bonding clamp 13 is firmly mounted to base 12*a* by bolt 43. A small circuit board which carries the other small components shown in the circuit of FIG. 2 is not shown in FIG. 6 for clarity. From FIG. 6 it can be seen that the primary surge current path is very direct and does not pass through any printed circuit board conductors. Further, the path to ground is completed directly through bond clamp 13 into ground conductor 39 as shown in FIG. 5.

A useful variation of the preferred embodiment is its application as a power inserter. As indicated by element 26 in FIG. 1, it is necessary to insert power onto the coaxial line at intervals to power the signal regenerating amplifiers, e.g. 22 and 23. This purpose can be accomplished within the supressor of the current invention by utilizing power insertion terminal 45 shown in FIG. 2. Since this point is RF isolated from center conductor 17 by RF choke 27, but is connected through 27 as an effective DC and low frequency path to conductor 17, it can serve as a power insertion point. The clamping trigger voltage controlled by sensing device 31 is chosen to be above the normal power supply voltage by a safe margin, so insertion point 45 is effectively isolated from ground by the clamping circuit for normal power supply voltages. By utilizing this as a power insertion point, the power supply is protected from surges coming down conductor 17, and the coaxial cable system is protected from any surges entering from the power supply.

Therefore, it can be seen that the present invention has a capability of protecting elements of the entire cable distribution system from outages occurring due to transient surges, from whatever source, within the cable system if the suppressor is placed in the co-ax line at locations which provide a reasonable chance of success in protecting the amplifiers and other equipment.

Various modifications may be made of the invention without departing from the scope thereof and it is desired therefore, that only such limitations shall be placed thereon as are imposed by the prior art and which are set forth in the appended claims.

What is claimed is:

1. An electrical suppressor for suppppressing an electricl transient by clamping the electrical transient directly directly to ground, the suppressor being inserted in a signal carrying center conductor of a co-axial cable transmission line, an information bearing radio frequency signal and a power supply current impressed upon the center conductor, comprising:

a mounting case for mounting the suppressor to said co-axial cable transmission line, sensing means within the case of sensing said electrical transient in the center conductor, a trigger means within the case electrically connected to and operable by said sensing means when said sensing means senses said electrical transient, said trigger means connected to ground to clamp the electrical transient directly to ground when said sensing means senses the electrical transient and causes said trigger means to energize and become conductive to shunt the electrical transient directly to ground, said trigger means in connection with said sensing means being effective to block conduction to ground of normal power supply current on the center conductor during absence of said electrical transient, a radio frequency choke connecting the suppressor to the center conductor, said radio frequency choke being effective to block the information bearing radio frequency signal being conveyed by the center conductor from passing through the suppressor to ground, said radio frequency choke being further effective to readily pass transient surge currents throught the suppressor to ground, a metal mounting base to which primary current carrying components of the suppressor are directly mounted, thereby providing a direct low resistance path for dissipation of heat and said transient surge currents, a bond clamp attached to the mounting base to which an external ground conductor is attached, thereby conveying said transient surge currents from the mounting base through a low resistance path to ground.

2. An electrical suppressor as claimed in claim 1, wherein the suppressor is electrically bi-directional.

3. An electrical suppressor as claimed in claim 1, further comprising:

a connection terminal at junction of said radio frequency choke and the suppressor whereby power may be injected into said co-axial cable transmission line.

4. A method of suppressing electrical transients in a radio-frequency co-axial cable system, the system having a cable with a center conductor, the system further having a plurality of electrically sensitive control devices mounted at spaced intervals within the system, which comprises:

mounting a suppressor circuit to the center conductor of the co-axial cable system, mounting a sensing means in the suppressor case, connecting the sensing means to a radio frequency choke, and thereby to the center conductor, the radio frequency choke being effective to block the radio frequency signal on the center conductor from the sensing means and also being effective to pass electrical transients to said sensing means, sensing the presence of electrical transients in the co-axial cable system, providing a trigger means within the suppressor case, connecting the trigger means to the sensing means and to the electrical grounding conductor so that when the sensing means senses the presence of electrical transients the trigger means shunts the transients directly to ground, mounting the trigger means directly to the base of the suppressor case, thereby providing a low resistance path for electrical transients from trigger means to ground, grounding the base of the suppressor case directly to ground by connecting an electrical conductor between the base and ground.

* * * * *

US005216569B1

REEXAMINATION CERTIFICATE (3653rd)

United States Patent [19]

Brookhiser

[11] B1 5,216,569

[45] Certificate Issued Oct. 27, 1998

[54] METHOD AND APPARATUS FOR SUPPRESSING CABLE LINE TRANSIENTS

[75] Inventor: William L. Brookhiser, Lawrenceville, Ga.

[73] Assignee: Cable Innovations, Inc., Lawrenceville, Ga.

Reexamination Request:
No. 90/004,743, Sep. 8, 1997

Reexamination Certificate for:

| | |
|---|---|
| Patent No.: | **5,216,569** |
| Issued: | **Jun. 1, 1993** |
| Appl. No.: | **872,064** |
| Filed: | **Apr. 22, 1992** |

Related U.S. Application Data

[63] Continuation-in-part of Ser. No. 705,719, May 24, 1991, abandoned.

[51] Int. Cl.$^6$ .......... H02H 7/00

[52] U.S. Cl. .......... 361/107; 361/118

[58] Field of Search .......... 361/56, 107, 111, 361/113, 117, 118, 119; 333/167, 172

[56] References Cited

PUBLICATIONS

Alpha Technology Amp Clamp Installation Guide, 1990.
Specifications AC–3 Series Amp Clamp Surge Suppressors, Apr. 1991.
Communications Technology, May 1989 issue, "In the Good Ol' Summertime".
1988 National Cable Television Association Technical Papers, pp. 128–132.

*Primary Examiner*—Matthew V. Nguyen

[57] ABSTRACT

An electrical grounding suppressor device, and the method of using the same, which is placed directly in line with the co-axial center conductor of cable television distribution lines without inhibiting or causing significant loss of the radio frequency signal in the co-ax line. An electronic circuit senses a transient surge on the co-ax line and triggers a rapid clamping action to ground to dissipate the harmful effects of the surge.

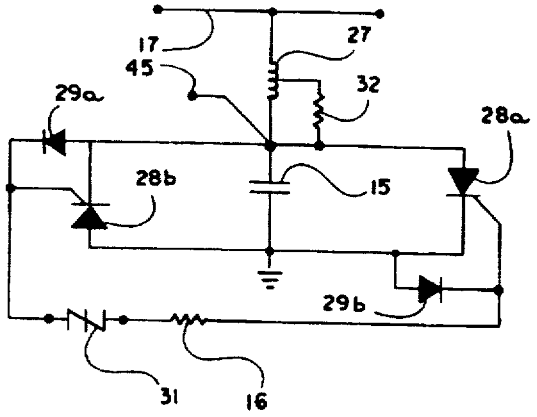

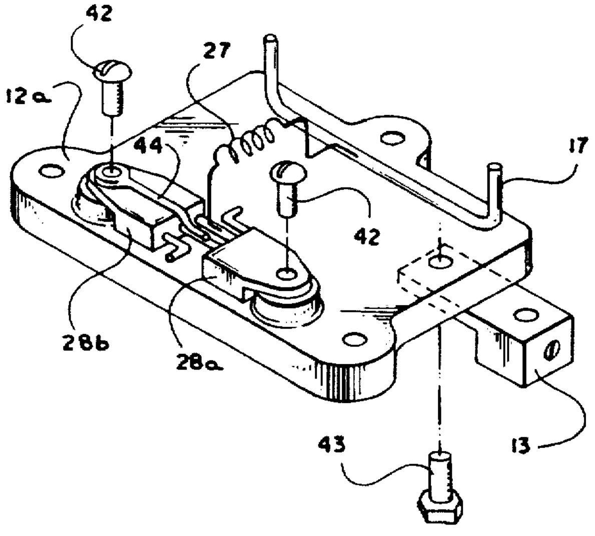

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are determined to be patentable as amended.

Claims 2 and 3, dependent on an amended claim, are determined to be patentable.

1. An electrical suppressor for suppressing an electrical transient by clamping the [electricl] *electrical* transient directly [directly] to ground, the suppressor being inserted in a signal carrying center conductor of a co-axial cable transmission line, an information bearing radio frequency signal and a power supply current impressed upon the center conductor, comprising:

a mounting case for mounting the suppressor to said co-axial cable transmission line, sensing means within the case of sensing said electrical transient in the center conductor, a trigger means within the case electrically connected to and operable by said sensing means when said sensing means senses said electrical transient, said trigger means connected to ground to clamp the electrical transient directly to ground when said sensing means senses the electrical transient and causes said trigger means to energize and become conductive to shunt the electrical transient directly to ground, said trigger means in connection with said sensing means being effective to block conduction to ground of normal power supply current on the center conductor during absence of said electrical transient, a radio frequency choke connecting the suppressor to the center conductor, said radio frequency choke being effective to block the information bearing radio frequency signal being conveyed by the center conductor from passing through the suppressor to ground, said radio frequency choke being further effective to readily pass transient surge currents [throught] *through* the suppressor to ground, a metal mounting base to which primary current carrying components of the suppressor are directly mounted, thereby providing a direct low resistance path for dissipation of heat and said transient surge currents, a bond clamp attached to the mounting base to which [an] *a separate* external ground conductor is attached, *the separate external ground conductor physically connecting the mounting base directly to ground without any intervening devices being mounted in the ground conductor between the mounting base and ground,* thereby conveying said transient surge currents from the mounting base through a low resistance path to ground.

4. A method of suppressing electrical transients in a radio-frequency co-axial cable system, the system having a cable with a center conductor, the system further having a plurality of electrically sensitive control devices mounted at spaced intervals within the system, which comprises:

mounting a suppressor circuit to the center conductor of the co-axial cable system, mounting a sensing means in the suppressor case, connecting the sensing means to a radio frequency choke, and thereby to the center conductor, the radio frequency choke being effective to block the radio frequency signal on the center conductor from the sensing means and also being effective to pass electrical transients to said sensing means, sensing the presence of electrical transients in the co-axial cable system, providing a trigger means within the suppressor case, connecting the trigger means to the sensing means and to the electrical grounding conductor so that when the sensing means senses the presence of electrical transients the trigger means shunts the transients directly to ground, mounting the trigger means directly to the base of the suppressor case, thereby providing a low resistance path for electrical transients from trigger means to ground, grounding the base of the suppressor case directly to ground by connecting [an electrical conductor *a separate external ground conductor which physically connects the suppressor case directly to ground without any intervening devices being mounted in the ground conductor* between the base and ground.

* * * * *